US011216031B2

(12) United States Patent
Stryker et al.

(10) Patent No.: US 11,216,031 B2
(45) Date of Patent: Jan. 4, 2022

(54) ACCESSORY COVER FOR A PORTABLE ELECTRONIC DEVICE

(71) Applicant: Apple Inc., Cupertino, CA (US)

(72) Inventors: James A. Stryker, San Francisco, CA (US); Caitlin M. Mclain, San Jose, CA (US); Travis C. Pedley, Scotts Valley, CA (US); Nicholas A. Treadwell, Cupertino, CA (US); Hao Zhu, San Jose, CA (US); Yang Zhou, San Jose, CA (US)

(73) Assignee: Apple Inc., Cupertino, CA (US)

( * ) Notice: Subject to any disclaimer, the term of this patent is extended or adjusted under 35 U.S.C. 154(b) by 278 days.

(21) Appl. No.: 16/277,999

(22) Filed: Feb. 15, 2019

(65) Prior Publication Data

US 2020/0081489 A1    Mar. 12, 2020

Related U.S. Application Data

(60) Provisional application No. 62/728,524, filed on Sep. 7, 2018.

(51) Int. Cl.
*A45C 11/00* (2006.01)
*G06F 1/16* (2006.01)
(Continued)

(52) U.S. Cl.
CPC ............ *G06F 1/1628* (2013.01); *A45C 11/38* (2013.01); *A45C 13/1069* (2013.01);
(Continued)

(58) Field of Classification Search
CPC ... A45C 11/38; A45C 13/005; A45C 13/1069; A45C 2011/002; A45C 2011/003; G06F 1/1628
(Continued)

(56) References Cited

U.S. PATENT DOCUMENTS 9,000,871 B2 *  4/2015  Cencioni ............... G06F 1/1626
                                                          335/219
9,559,742 B2    1/2017  Ye et al.
(Continued)

FOREIGN PATENT DOCUMENTS

CN    202257394 U    5/2012
CN    203073388 U    7/2013
(Continued)

OTHER PUBLICATIONS

International Patent Application No. PCT/US2019/023929—International Search Report and Written Opinion dated Jul. 11, 2019.
(Continued)

*Primary Examiner* — King M Chu
(74) *Attorney, Agent, or Firm* — Dickinson Wright RLLP

(57) ABSTRACT

An accessory device for a portable electronic device is described. The accessory device includes a front cover connected to a back cover. The front cover includes multiple segments rotatable with respect to each other. The segments include magnets that allow the segments, through magnetic coupling, to couple with another segment or with the portable electronic device. When the front cover engages the back cover, a user may remove, or pull away, a segment from the back cover, causing the remaining segments to sequentially fall away from the back cover. In some instances, when the front cover at least partially engages the back cover, one of the segments includes magnets designed to couple with magnets in the back cover, but not with magnets in another segment. The accessory device may further include an opening that receives a camera assembly of the portable electronic device and forms a mechanical interlock.

19 Claims, 12 Drawing Sheets

(51) Int. Cl.
*A45C 13/10* (2006.01)
*A45C 11/38* (2006.01)

(52) U.S. Cl.
CPC .......... *G06F 1/1626* (2013.01); *G06F 1/1681* (2013.01); *A45C 2011/002* (2013.01); *A45C 2011/003* (2013.01); *G06F 2200/1633* (2013.01); *G06F 2200/1634* (2013.01)

(58) Field of Classification Search
USPC ........................................................ 206/320
See application file for complete search history.

(56) References Cited

U.S. PATENT DOCUMENTS

| | | |
|---|---|---|
| 10,211,874 B2 | 2/2019 | Kao et al. |
| 2012/0069503 A1 | 3/2012 | Lauder et al. |
| 2013/0277271 A1 | 10/2013 | Toulotte |
| 2013/0328917 A1 | 12/2013 | Zambetti et al. |
| 2014/0036438 A1* | 2/2014 | Gioscia ................ G06F 1/1628 361/679.55 |
| 2015/0049426 A1* | 2/2015 | Smith ................... G06F 1/1628 361/679.27 |
| 2015/0141092 A1 | 5/2015 | Murauyou et al. |
| 2015/0263776 A1* | 9/2015 | Shyu .................... A45C 13/002 455/575.8 |
| 2015/0359120 A1* | 12/2015 | Huang ................. A45C 13/005 206/45.23 |
| 2017/0068282 A1 | 3/2017 | Smith et al. |
| 2017/0235339 A1* | 8/2017 | Scales .................. G06F 1/1626 361/679.56 |

FOREIGN PATENT DOCUMENTS

| | | |
|---|---|---|
| CN | 203720729 U | 7/2014 |
| CN | 204215311 U | 3/2015 |
| CN | 108268092 A | 7/2018 |
| WO | 2016163659 A1 | 10/2016 |

OTHER PUBLICATIONS

Utility Model Patentability Evaluation Report (UMPER) dated Dec. 31, 2019.

* cited by examiner

ACCESSORY COVER FOR A PORTABLE ELECTRONIC DEVICE

CROSS-REFERENCE TO RELATED APPLICATION(S)

This application claims the benefit of priority to U.S. Provisional Application No. 62/728,524, filed on Sep. 7, 2018, titled "ACCESSORY COVER FOR A PORTABLE ELECTRONIC DEVICE," the disclosures of which are incorporated herein by reference in their entirety.

FIELD

The following description relates to accessory devices. In particular, the following description relates to accessory cases and covers that can be used with portable electronic devices. Accessory cases, accessory covers, or accessory devices described herein may include covers, folios, protective covers, protective devices, or the like.

BACKGROUND

Accessory devices are designed to provide a protective cover for electronic devices. An accessory device can protect the housing, the display, and/or the transparent cover of the electronic device.

SUMMARY

In one aspect, an accessory device for a portable electronic device is described. The accessory device may include a first section that defines a receiving surface for the portable electronic device. The first section may include a back surface opposite the receiving surface. The accessory device may further include a second section coupled with the first section and capable of covering the portable electronic device. The second section may include a first segment and a second segment. In some instances, a removal of the first segment from the back surface initiates an automatic removal of the second segment from the back surface second segment.

In another aspect, an accessory device for a portable electronic device is described. The accessory device may include a first section that defines a receiving surface for the portable electronic device. The accessory device may further include a second section coupled with the first section and capable of covering the portable electronic device. In some instances, when the portable electronic devices is positioned on the receiving surface and the second section covers the portable electronic device, the first section and second section extend laterally beyond edges of the portable electronic device.

In another aspect, an accessory device for a portable electronic device is described. The accessory device may include a first section that defines a receiving surface for the portable electronic device. The first section further may include a back surface opposite the receiving surface. The accessory device may further include a first magnetic element embedded in the first section. The accessory device may further include a second section coupled with the first section and capable of covering the portable electronic device. The accessory device may further include a second magnetic element embedded in the second section. In some instances, a magnetic coupling between the first magnetic element and the second magnetic element causes the second section to align with the back surface.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
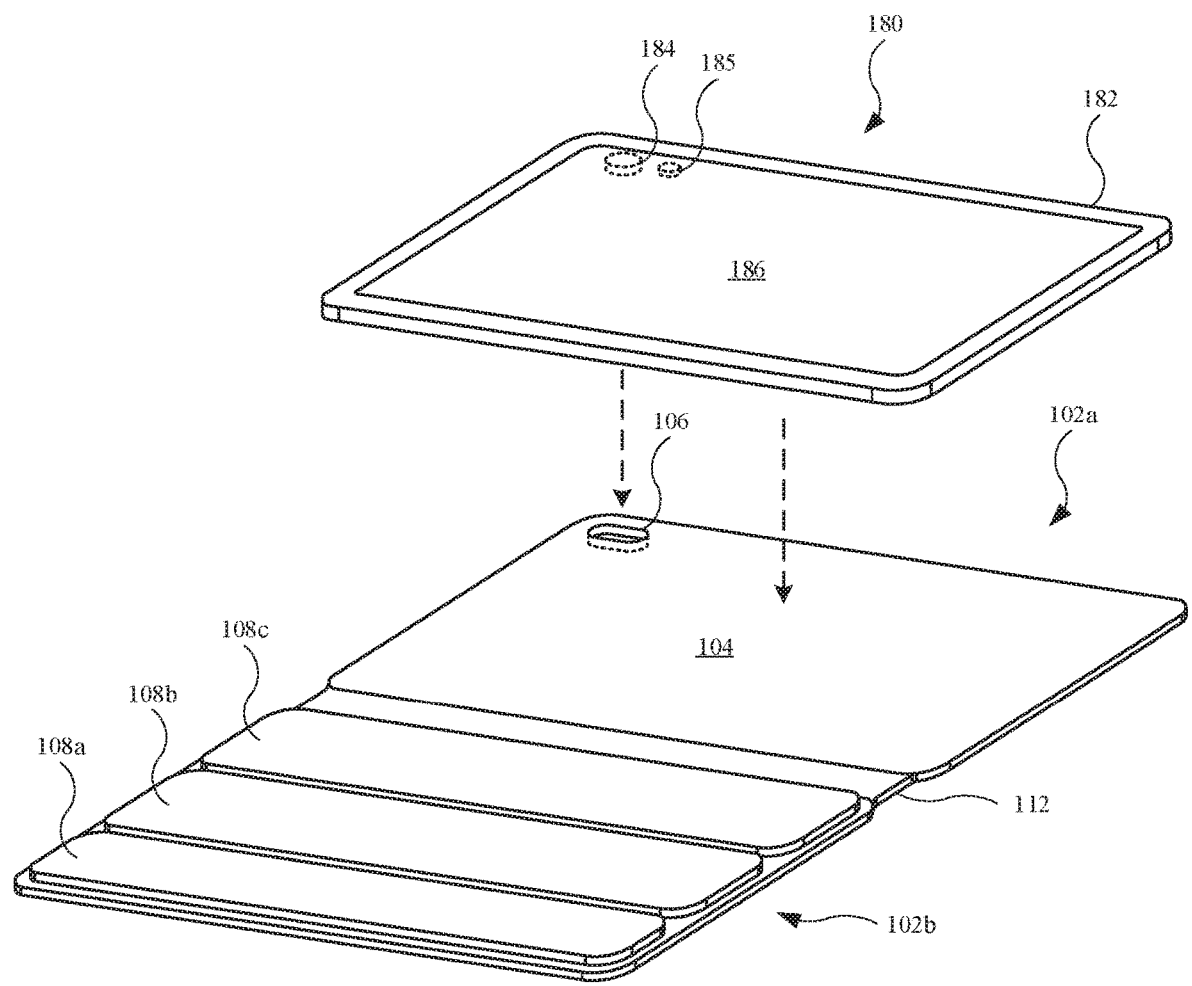
FIG. 1 illustrates an isometric view of an embodiment of an accessory device, in accordance with some described embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to accessory devices for use with portable electronic devices, such as mobile wireless communication devices and tablet computer devices. Accessory devices described herein may be referred to as covers, cases, protective covers, protective cases, or folios, as non-limiting examples. Accessory devices are designed to house and protect portable electronic devices. In this regard, accessory devices herein may cover both the transparent cover (or cover glass) positioned over the display assembly of the portable electronic device as well as the housing of the electronic device. As a result, an accessory device described herein may provide protection against damage to a portable electronic device.

An accessory device may include a back cover (also referred to as a first section or back panel) attached to a front cover (also referred to as a second section or front panel) by a hinge. The front cover can cover the transparent cover of the portable electronic device, while the back cover can at least partially cover the housing of the electronic device. The front cover may include multiple segments that are rotatable with respect to each other. At least some of the segments may include magnets that allow the segments to couple, or secure, with each other (through magnetic coupling) as well as with the portable electronic device (through magnetic coupling with magnets in the portable electronic device). Further, when the segments couple with each other, the front cover may fold and form a support, or stand, for the portable electronic device.

The back cover may provide a receiving surface for the electronic device. Also, the back cover may include several magnets designed to magnetically couple with magnets in the portable electronic device. Further, at least some magnets in the front cover may magnetically couple with magnets in the back cover. This allows for a configuration of the accessory device in which the front cover is stored behind the back cover. As a result, the accessory device provides a compact design with a reduced footprint. Also, prior to the front cover lying flat against the back cover (and while an air pocket separates the front cover from the back cover), some magnets in the front cover may magnetically couple with magnets in the back cover. In this manner, the magnetic coupling may provide a force that shifts, or moves, the front cover and aligns the front cover with the back cover. This allows the hinge that couples the front cover to the back cover to provide additional flexibility, as the magnetic coupling can align the front and back covers with each other.

These and other embodiments are discussed below with reference to FIGS. 1-20. However, those skilled in the art will readily appreciate that the detailed description given herein with respect to these Figures is for explanatory purposes only and should not be construed as limiting.

FIG. 1 illustrates an isometric view of an embodiment of an accessory device 100, in accordance with some described embodiments. The accessory device 100 is designed for use with an electronic device 180, including portable electronic devices such as mobile wireless communication devices and tablet computer devices. In this regard, the accessory device 100 may be referred to as a case, a cover, a protective cover, a protective case, a folio, or the like.

As shown, the accessory device 100 may include a first section 102*a* coupled to a second section 102*b*. The first section 102*a* may define a back cover or back panel for the electronic device 180. Also, the first section 102*a* may define a receiving surface 104 that receives the electronic device 180, and in particular, a housing 182 of the electronic device 180. In this regard, the first section 102*a* may retain the electronic device 180 with one or more magnets embedded in the first section 102*a*. This will be shown and discussed below. The first section 102*a* may further include an opening 106, or through hole, designed to receive a camera assembly 184 and a flash module 185 (both shown as dotted lines) of the electronic device 180.

The second section 102*b* is designed to wrap around and cover the electronic device 180, including a display 186 of the electronic device 180. In this manner, the second section 102*b* may be referred to as a front panel or front cover. The second section 102*b* may include multiple segments. For example, the second section 102*b* may include a first segment 108*a*, a second segment 108*b*, and a third segment 108*c*. Each segment is rotatable or moveable with respect to the remaining segments. Also, while a discrete number of segments are shown, the number of segments may vary in other embodiments.

The second section 102*b* is coupled to the first section 102*a* by a hinge 112 such that the first section 102*a* is rotatable with respect to the second section 102*b*, and vice versa. The hinge 112 may be formed in part by one more continuous pieces of material that extend along the first section 102*a* and the second section 102*b*. The materials that form the layer(s) may include polymers, such as polyurethane, that wrap around a fiberglass material. Other materials, such as leather, are possible. However, in order to promote flexibility and relative movement of the aforementioned sections and segments, the fiberglass material (and/or other relatively rigid or stiff materials) may not be located at the hinge 112 and may not be located between the segments. This will be shown and described below. Also, a soft, non-abrasive material, such as microfiber, may cover the first segment 108a, the second segment 108b, and the third segment 108c. In this manner, when the second section 102b wraps around and covers the display 186 (which may include transparent cover overlaying the display 186), the soft, non-abrasive material does not cause damage when in contact with the transparent cover.

Figure 2:
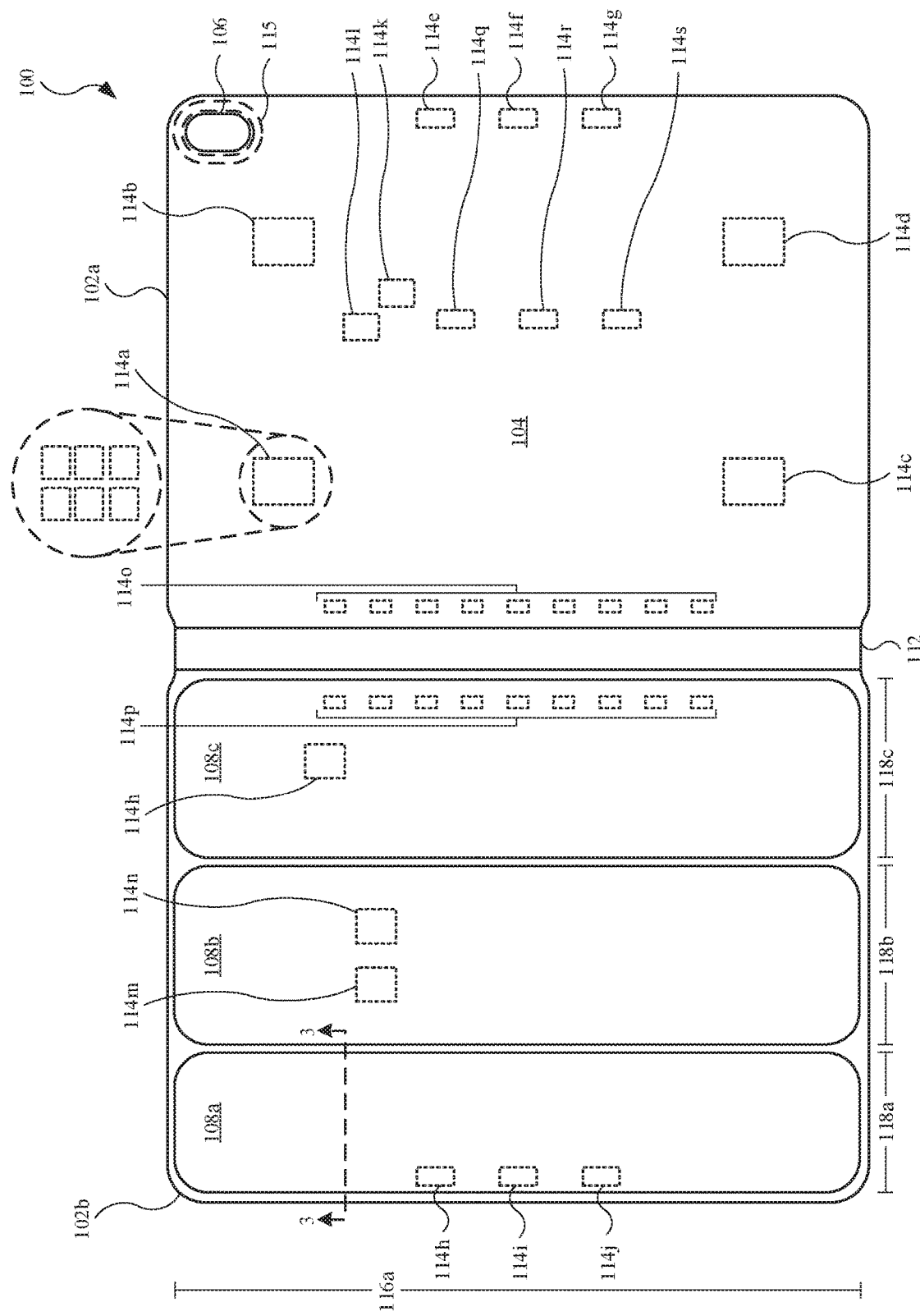
FIG. 2 illustrates a plan view of the accessory device shown in FIG. 1, showing a layout of magnets in the accessory device.

FIG. 2 illustrates a plan view of the accessory device 100 shown in FIG. 1, showing a layout of magnets in the accessory device 100. The magnets (or magnetic elements) described herein may include permanent magnets, ferromagnetic materials, rear Earth magnets, or other magnetically attractable materials. As shown, the accessory device 100 may include magnetic elements 114a, magnetic elements 114b, magnetic elements 114c, and magnetic elements 114d located in the first section 102a. The magnetic elements 114a, the magnetic elements 114b, the magnetic elements 114c, and the magnetic elements 114d are designed to magnetically couple with magnets in the electronic device 180 (shown in FIG. 1) to retain the electronic device 180 with the receiving surface 104. As a result, the accessory device 100 does not require mechanical features (such as retaining walls, sidewalls, or mechanical interlocks) to retain the electronic device 180. Furthermore, the magnetic elements in the accessory device 100 that magnetically couple with magnets in the electronic device 180 provide a magnetic attraction force capable of holding the electronic device 180 even when forces, such as gravitational force, are acting on the electronic device 180 that would otherwise cause the electronic device 180 to detach from the accessory device 100.

Some magnetic elements (shown as dotted lines) shown and described in FIG. 2 may include several discrete magnetic elements. For example, as shown in the enlarged view, the magnetic elements 114a includes six discrete magnetic elements. The number of magnetic elements may vary in other embodiments. By using several, smaller discrete magnetic elements, as opposed to using fewer, but larger magnetic elements, the ease of aligning the electronic device 180 (shown in FIG. 1) with the first section 102a increases. For example, each magnetic element provides a relatively small external magnetic field (not shown in FIG. 2), thereby reducing the magnetic attraction force per magnetic element during the alignment. However, the magnetic elements, as a group (such as the cluster of the magnetic elements 114a), may provide a similar collective external magnetic field as that of a single, larger magnetic element. As a result, the magnetic attraction force of the group of magnetic elements is similar to that of a single, larger magnetic element, while the ease of alignment is increased, as compared to the use of the single, larger magnetic element.

The accessory device 100 may further include magnetic elements 114e, magnetic elements 114f, and magnetic elements 114g in the first section 102a that are designed to magnetically couple with magnetic elements 114h, magnetic elements 114i, and magnetic elements 114j, respectively, in the second section 102b. These magnetic couplings may occur when, for example, a back surface (not shown in FIG. 2) of the second section 102b is rotated over and onto a back surface (not shown in FIG. 2) of the first section 102a via the hinge 112, with the back surface of the first section 102a being opposite the receiving surface 104. Also, these magnetic couplings may occur when the second section 102b is rotated over and onto the receiving surface 104.

The accessory device 100 may further include magnetic elements 114k and magnetic elements 114l located in the first section 102a that are designed to magnetically couple with magnetic elements 114m and magnetic elements 114n, respectively, located in the second section 102b, and in particular, the second segment 108b. The magnetic elements 114m and the magnetic elements 114n are parallel (or aligned) with each other, while the magnetic elements 114k are offset (or misaligned) with respect to the magnetic elements 114l. Also, when the aforementioned back surfaces of the first section 102a and the second section 102b are engaged with each other, the magnetic elements 114k and the magnetic elements 114l are offset with respect to the magnetic elements 114m and the magnetic elements 114n, respectively. However, the degree of offset between the magnetic elements 114k and the magnetic elements 114m may differ from that of the magnetic elements 114l and the magnetic elements 114n. In this manner, when the back surface of the second section 102b is positioned against the back surface of the first section 102a, the magnetic attraction between the magnetic elements 114k and the magnetic elements 114m may differ from the magnetic attraction between the magnetic elements 114k and the magnetic elements 114m. For example, the magnetic attraction between the magnetic elements 114k and the magnetic elements 114m may be greater than the magnetic attraction between the magnetic elements 114k and the magnetic elements 114m. As a result, when the magnetic elements 114k are no longer coupled to the magnetic elements 114m, the magnetic elements 114l are no longer coupled to the magnetic elements 114n. This may be part of a comprehensive process in which a removal of the first segment 108a from the back surface of the first section 102a initiates a subsequent removal the second segment 108b and the third segment 108c from the back surface of the first section 102a without any additional force required other than the force required to pull the first segment 108a away from the back surface of the first section 102a. In other words, when the first segment 108a is removed from the back surface, the second segment 108b and the third segment 108c may automatically fall away from the back surface of the first section 102a. This will be shown and described later.

The accessory device 100 may further include magnetic elements 114o located in the first section 102a that are designed to magnetically couple with magnetic elements 114p located in the second section 102b, and in particular, the third segment 108c. When the second section 102b is positioned against the back surface of the first section 102a, the magnetic elements 114o magnetically couple with magnetic elements 114p. Further, while the second section 102b is rotated over and onto the back surface of the first section 102a, the magnetic elements 114p magnetically couple with the that magnetic elements 114o prior to the second section 102b fully lying on the back surface of the first section 102a. The magnetic coupling can provide a magnetic attraction force that pulls the second section 102b in a manner that aligns the second section 102b with the back surface to prevent misalignment between the second section 102b and the first section 102a. In other words, the second section 102b will not be crooked with respect to the first section 102a as a result of the magnetic coupling between the magnetic elements 114o and the magnetic elements 114p. This will be further detailed below.

Also, the accessory device 100 may include a reinforcement layer 115 positioned in the first section 102a around the opening 106. The reinforcement layer 115 may provide additional rigidity to a void or space that defines the opening 106. This may prevent the first section 102a from breaking along the corner in which the reinforcement layer 115 is located. In some embodiments, the reinforcement layer 115 includes a glass fiber material having a relatively high density. However, other materials (such as metals, rigid plastics, as non-limiting examples) are possible. Further, the first section 102a, and in particular, the receiving surface 104, is generally planar. However, in some instances, the first section 102a may include a localized thickness in a location corresponding to the opening 106, due in part to a thicker reinforcement layer, as compared to the reinforcement layer 115 shown in FIG. 2.

The accessory device 100 may include certain dimensional characteristics. For example, the hinge 112 may include a dimension 116a that the same as, or at least substantially similar to, a major dimension of the electronic device 180. The "major dimension" may refer to a dimension of greatest length of the electronic device 180. Also, the dimensions of some of the segments may differ. For example, the first segment 108a may include a dimension 118a that is less than a dimension 118b of the second segment 108b and less than a dimension 118c of the third segment 108c. Further, the dimension 118b of the second segment 108b can be the same as, or at least substantially similar, to the dimension 118c of the third segment 108c. However, other dimensional relationships of the first segment 108a, the second segment 108b, and/or the third segment 108c are possible.

Additionally, the accessory device 100 may include magnetic elements 114q, magnetic elements 114r, and magnetic elements 114s embedded in the first section 102a. In some instances, when the first segment 108a is engaged with the second segment 108b, the magnetic elements 114h, the magnetic elements 114i, and the magnetic elements 114j can magnetically couple with the magnetic elements 114q, the magnetic elements 114r, and the magnetic elements 114s, respectively. This will be shown below.

Figure 3:
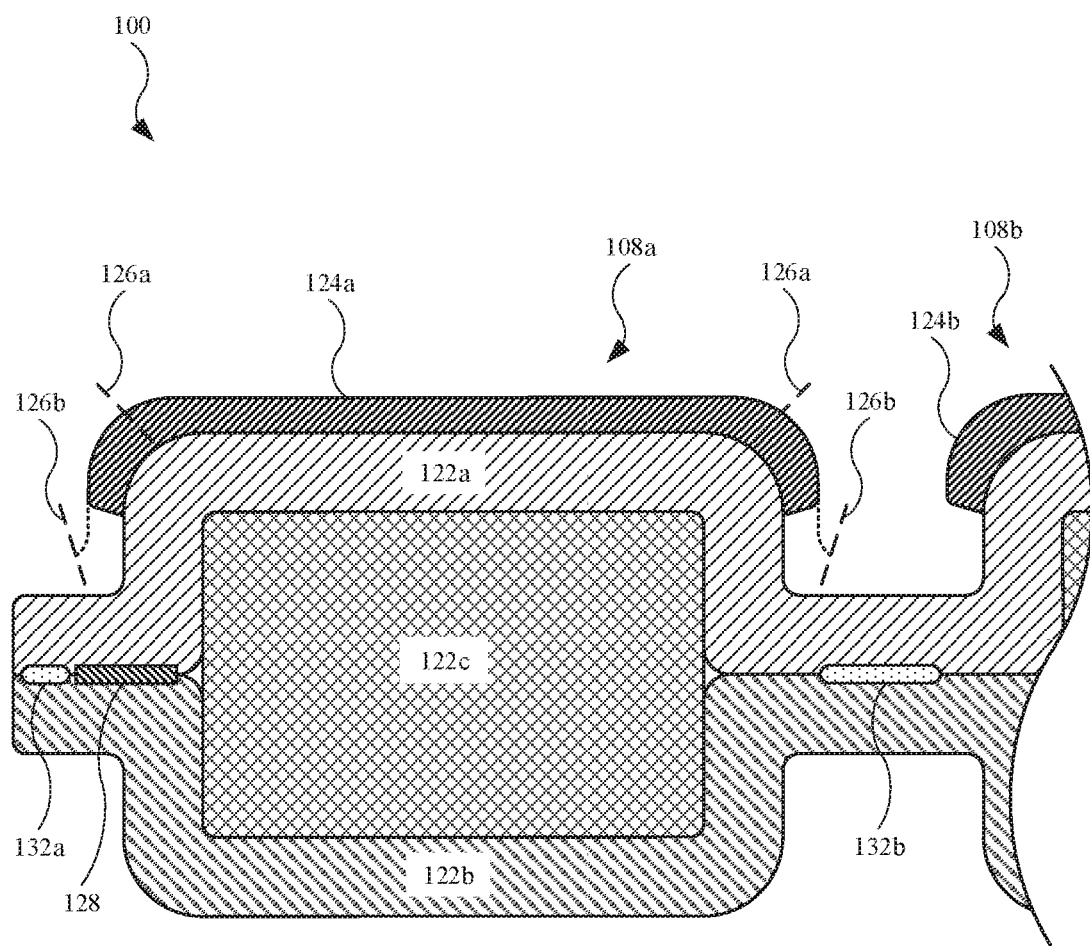
FIG. 3 illustrates a cross sectional view of the accessory device shown in FIG. 2, taken across line 3-3, showing various features of the accessory device.

FIG. 3 illustrates a cross sectional view of the accessory device 100 shown in FIG. 2, taken across line 3-3, showing various features of the accessory device 100. The accessory device 100 may include a first layer 122a and a second layer 122b. The first layer 122a and the second layer 122b may include a polymer layer that extends across both the first section 102a and the second section 102b (shown in FIGS. 1 and 2). Alternatively, each of the first layer 122a and the second layer 122b may include other materials, such as leather. In this regard, the first layer 122a and the second layer 122b may define the hinge 112 (shown in FIGS. 1 and 2). The accessory device 100 may further include a third layer 122c that is surrounded by the first layer 122a and the second layer 122b. The third layer 122c may include a relatively rigid material, such as fiberglass (as a non-limiting example). The third layer 122c may fill each of the segments. For example, as shown, the third layer 122c fills the first segment 108a. However, the third layer 122c may be confined to the first segment 108a to promote flexibility of the second section 102b (shown in FIGS. 1 and 2) and relative movement among the segments. Also, although not shown, the first layer 122a and the second layer 122b may terminate along the second section 102b and additional layers (similar to that of the first layer 122a and the second layer 122b) may form the first section 102a. In this regard, the hinge 112 (shown in FIGS. 1 and 2) may be formed from a material other than the first layer 122a and the second layer 122b.

The accessory device 100 may further include a layer on each of the segments. For example, the first segment 108a includes a layer 124a. The layer 124a may include a fabric layer, including microfiber. Generally, the layer 124a may include a material that prevents scratching of glass (or other transparent cover or transparent layer) of the electronic device 180 (shown in FIG. 1). In order to promote flexibility, the layer 124a may terminate at (or may be confined to) the first segment 108a. Further, the layer 124a can be applied to an uppermost (flat) surface of the first segment 108a, as well as a portion of the bends (along the first layer 122a) that surround the uppermost surface. In some instances, the layer 124a extends along a surface that is generally perpendicular to the uppermost surface. However, the layer 124a may terminate prior to reaching an additional surface that is parallel, or at least substantially parallel, to the uppermost surface. Generally, the layer 124a may extend between a first line 126a and a second line 126b, shown at each end of the first segment 108a. It should be noted that the second segment 108b and the third segment 108c (both shown in FIGS. 1 and 2) may include the same layers, including the same features and configurations of the layers, as shown for the first segment 108a. For example, a layer 124b (separate from the layer 124a) is positioned on the second segment 108b.

The accessory device 100 may further include a stiffening element 128 positioned between the first layer 122a and the second layer 122b. The stiffening element 128 may include glass fiber, a rigid plastic, or a metal, as non-limiting examples. The accessory device 100 may further include an adhesive 132a and an adhesive 132b that secure the first layer 122a with the second layer 122b.

Figure 4:
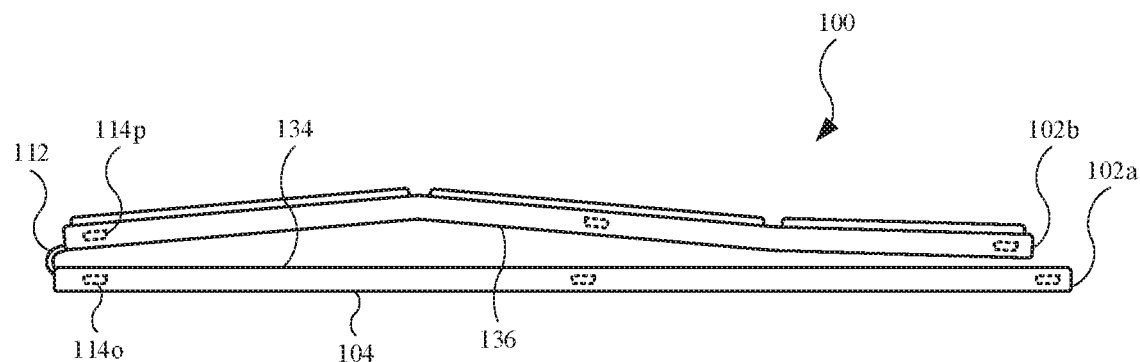
FIG. 4 illustrates a side view of the accessory device, showing the second section partially positioned over a back surface of the first section.

FIG. 4 illustrates a side view of the accessory device 100, showing the second section 102b partially positioned over the back surface 134 of the first section 102a. It may desirable to configure the accessory device 100 such that a back surface 136 of the second section 102b lies flat against the back surface 134 (opposite the receiving surface 104) of the first section 102a, as this configuration provides a more compact device.

Figure 5:
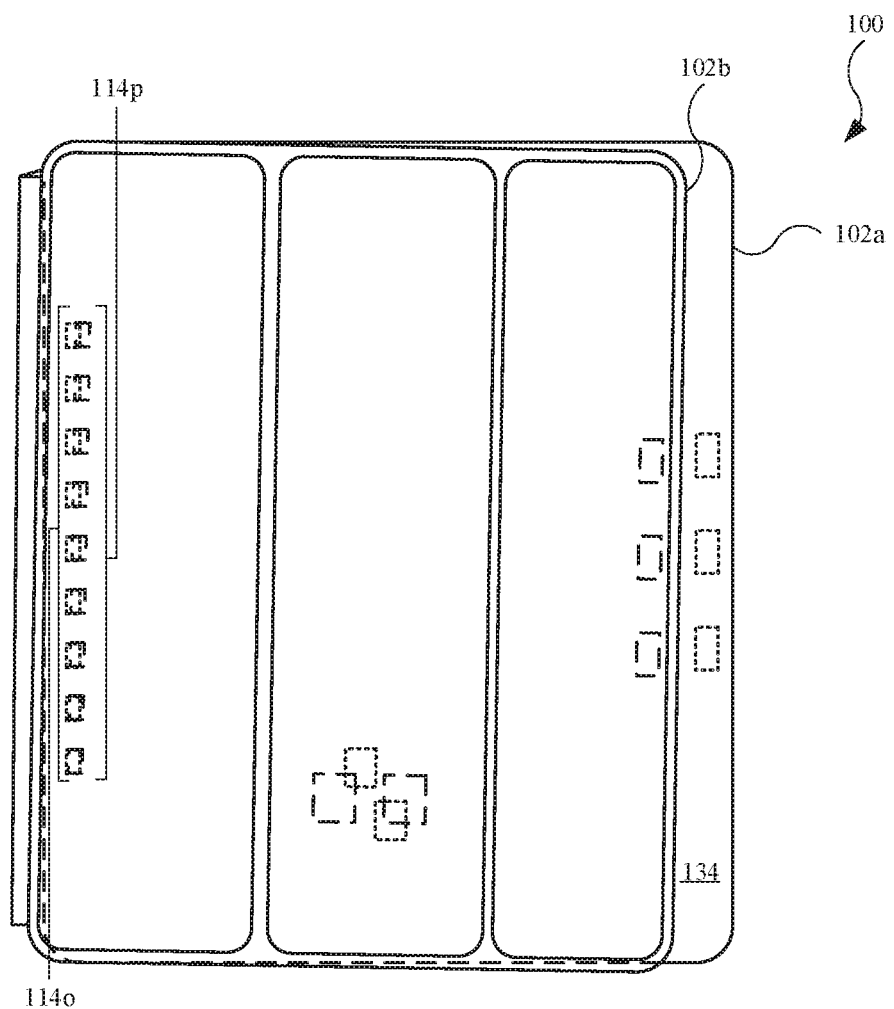
FIG. 5 illustrates a plan view of the accessory device shown in FIG. 4, showing the second section partially aligned with the first section.

Due in part to the hinge 112 having minimal, if any, stiffening elements and/or adhesives, the hinge 112 is relatively flexible but may allow misalignment of the second section 102b with respect to the first section 102a. For example, FIG. 5 illustrates a plan view of the accessory device 100 shown in FIG. 4, showing the second section 102b partially aligned with the first section 102a. As shown, the edges of the second section 102b are not aligned with the edges of the first section 102a. Without any other force(s) acting on the second section 102b, the second section 102b may be crooked when the second section 102b lies on the back surface 134. However, the magnetic elements 114o in the first section 102a can magnetically couple with the magnetic elements 114p in the second section 102b. The magnetic coupling provides a magnetic attraction force capable of pulling the magnetic elements 114p in the second section 102b toward the magnetic elements 114o in the first section 102a.

Figure 6:
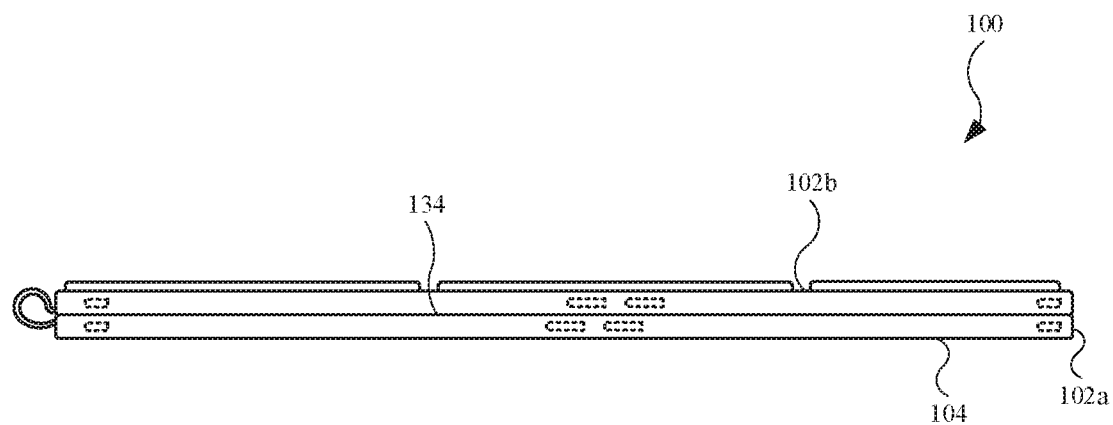
FIG. 6 illustrates a side view of the accessory device, showing the second section positioned over, and engaged with, the back surface of the first section.

The pulling force caused by the magnet attraction between the aforementioned magnetic elements causes the second section 102b to align with the first section 102a in a more desired manner. For example, FIG. 6 illustrates a side view of the accessory device 100, showing the second section 102b positioned over, and engaged with, the back surface 134 of the first section 102a. The back surface of the second section 102b may lie on the back surface 134 of the first section 102a such that the back surface 134 of the first section 102a (including the edges) is covered by the second section 102b. It should be noted that once the second section 102b and the first section 102a are aligned, the accessory device 100 may be rotated 180 degrees such that the second section 102b is positioned on a surface (not shown), such as a desk or table. In this manner, the electronic device 180 (shown in FIG. 1) may be positioned on the receiving surface 104 of the first section 102a.

Figure 7:
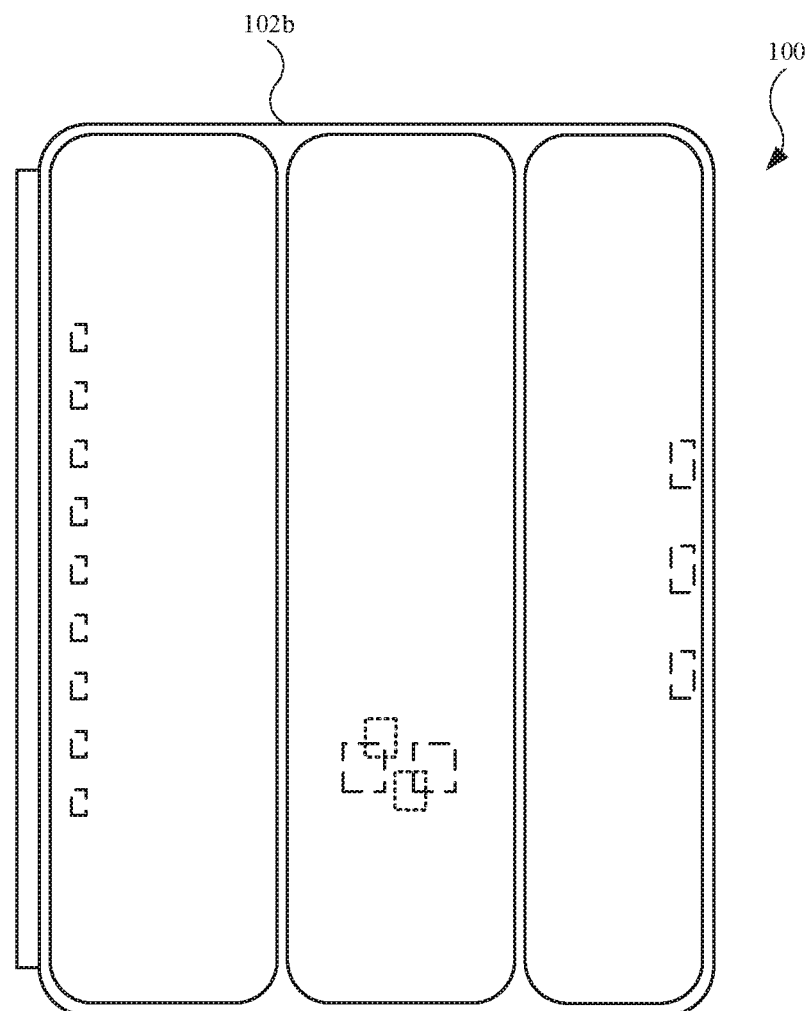
FIG. 7 illustrates a plan view of the accessory device shown in FIG. 6, showing the second section aligned with the first section.

FIG. 7 illustrates a plan view of the accessory device 100 shown in FIG. 6, showing the second section 102b aligned with the first section 102a. As shown, the second section 102b is positioned over the back surface 134 of the first section 102a (both labeled in FIG. 6). FIG. 7 represents an aligned configuration between the first section 102a and the second section 102b. In the aligned configuration, each corner of the first section 102a covers a respective corner of the second section 102b such that in the plan view (shown in FIG. 7) the first section 102a covers the second section 102b. Alternatively, the aligned configuration may also include each corner of the second section 102b (not shown in FIG. 7) covering a respective corner of the first section 102a such that in an alternate plan view the second section 102b covers the first section 102a.

Referring again to FIGS. 4 and 5, as the second section 102b is folded over the back surface 134 of the first section 102a, the second section 102b may momentarily lie on ambient air (such as an air blanket). This allows the magnetic elements 114o in the first section 102a to magnetically couple with the magnetic elements 114p in the second section 102b prior to the second section 102b engaging the first section 102a. However, in some instances, the second section 102b may partially engage the first section 102a prior to the magnetic coupling between the magnetic elements 114o and the magnetic elements 114p. Nonetheless, the magnetic attraction force between the magnetic elements 114o and the magnetic elements 114p is capable of aligning the second section 102b with the first section 102a, as shown in FIGS. 6 and 7.

Figure 8:
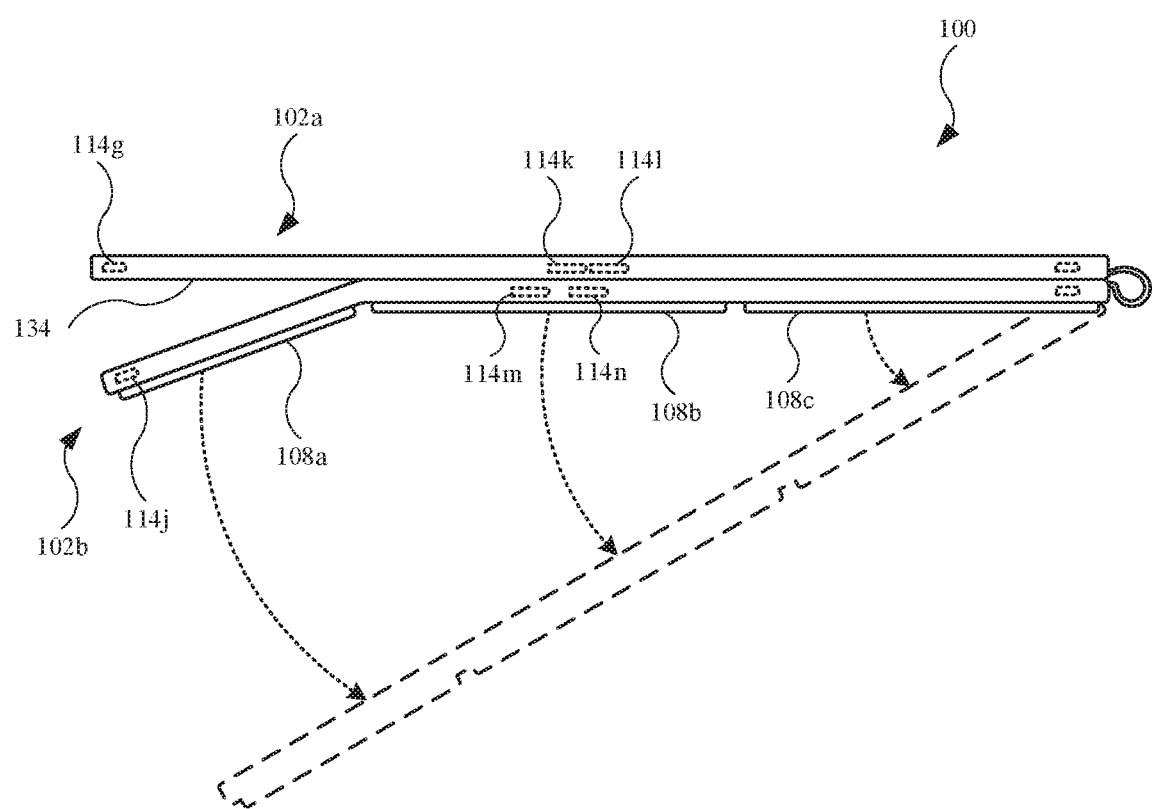
FIG. 8 illustrates a side view of the accessory device, showing the first segment of the second section pulled away from the back surface of the first section.

FIG. 8 illustrates a side view of the accessory device 100, showing the first segment 108a of the second section 102b pulled away from the back surface 134 of the first section 102a. As shown, a pulling force can be applied to the second section 102b that overcomes magnet attraction force formed by the magnetic coupling between the magnetic elements 114g in the first section 102a and the magnetic elements 114j in the second section 102b. The pulling force may also overcome the magnetic attraction force of magnetic elements 114e and the magnetic elements 114j (both shown in FIG. 2) with the magnetic elements 114h and the magnetic elements 114i (both shown in FIG. 2), respectively, and cease the magnetic coupling.

Once the first segment 108a is pulled away from the back surface 134, the second segment 108b and the third segment 108c may disengage the back surface 134, as denoted by the dotted lines. Moreover, the second segment 108b and the third segment 108c may disengage the back surface 134 without any additional pulling force applied to the second section 102b. In other words, the force that causes disengagement between the first segment 108a and the back surface 134 is sufficient to initiate disengagement of the second segment 108b and the third segment 108c with the back surface 134. As a result, once the magnetic elements in the first segment 108a are no longer magnetically coupled with magnetic elements in the first section 102a and the first segment 108a is pulled away from the back surface 134 of the first section 102a, a disengagement of the second segment 108b and the third segment 108c from the back surface 134 is initiated in a sequential manner. That is, the second segment 108b disengages from the back surface 134, followed by the third segment 108c disengaging from the back surface 134. This is due in part to the magnetic coupling and offset alignment between the magnetic elements 114k and the magnetic elements 114l in the first section 102a with the magnetic elements 114m and the magnetic elements 114n, respectively, in the second section 102b.

Figure 9:
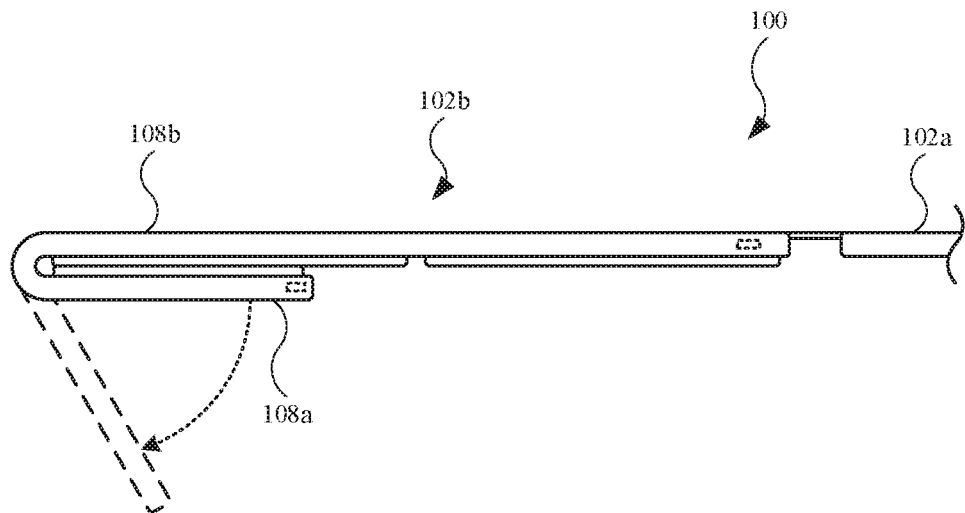
FIG. 9 illustrates a side view of the accessory device, showing the first segment engaged with the second segment.

FIG. 9 illustrates a side view of the accessory device 100, showing the first segment 108a engaged with the second segment 108b. Without any external force, the first segment 108a will disengage and fall away from the second segment 108b due to gravitational forces, as indicated by the dotted lines. Also, as shown, the first section 102a is folded away from the second section 102b such that the second section 102b is not engaged with the first section 102a.

Figure 10:
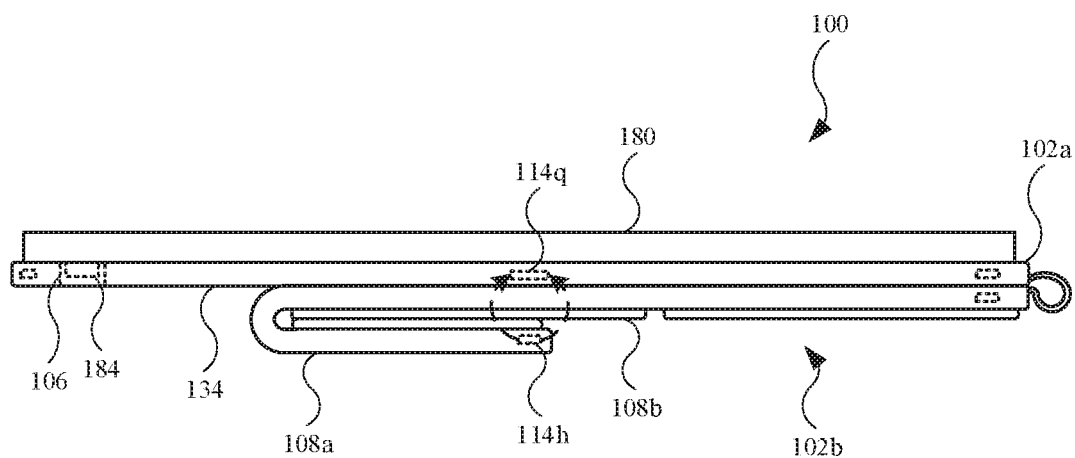
FIG. 10 illustrates a side view of the accessory device, showing the first section partially engaged with the second section, and the first segment rotated to engage the second segment.

FIG. 10 illustrates a side view of the accessory device 100, showing the first section 102a partially engaged with the second section 102b, and the first segment 108a rotated to engage the second segment 108b. As shown, the magnetic elements 114h in the first segment 108a are magnetically coupled with the magnetic elements 114q in the first section 102a. The magnetic elements 114h and the magnetic elements 114i (both shown in FIG. 2) in the first segment 108a may also magnetically couple with the magnetic elements 114r and the magnetic elements 114s (both shown in FIG. 2), respectively, in the first section 102a. As a result, the first segment 108a remains engaged with the second segment 108b due in part to the magnetic coupling between magnetic elements in the first segment 108a and magnetic elements in the first section 102a. Moreover, the first segment 108a no longer covers a portion of the back surface 134 such that the camera assembly 184 of the electronic device 180 can protrude through the opening 106 and capture images. FIGS. 9 and 10 illustrates that the first segment 108a may not remain engaged with the second segment 108b unless the first section 102a engages the second section 102b such that the magnetic elements in the first segment 108a can magnetically couple with magnetic elements in the first section 102a.

Figure 11:
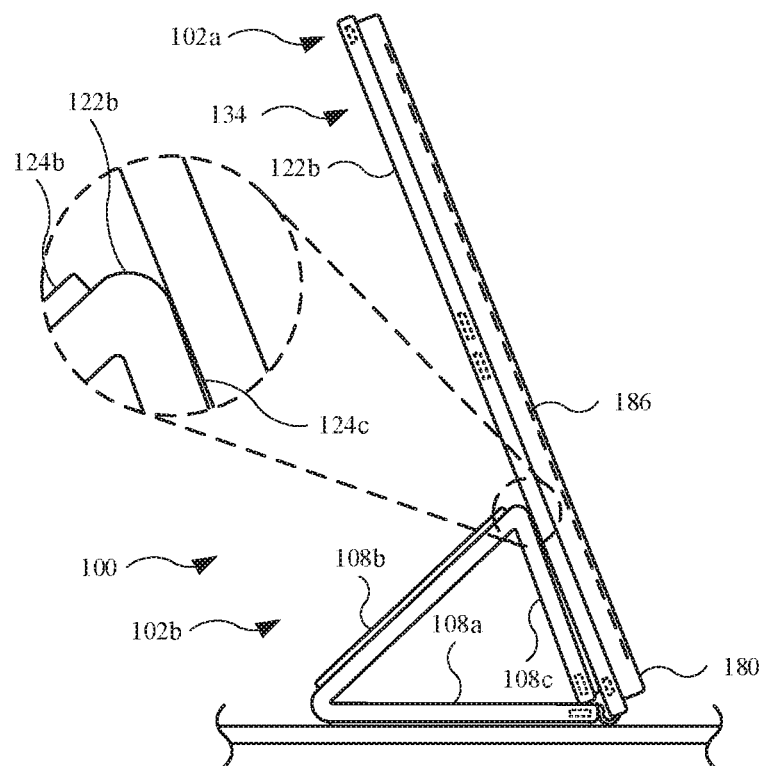
FIG. 11 illustrates a side view of the accessory device supporting the electronic device.

FIG. 11 illustrates a side view of the accessory device 100 supporting the electronic device 180. In this configuration, a user of the electronic device 180 can interact with the display 186 (shown as a dotted line) of the electronic device 180 when the display 186 includes touchscreen capabilities. As shown, the electronic device 180 is engaged with the first section 102a, and magnetic elements in the electronic device 180 magnetically couple to magnetic elements in the first section 102a. Further, the second section 102b can fold such that first segment 108a, the second segment 108b, and the third segment 108c form a triangular support for the electronic device 180. As shown in the enlarged view, due in part to the layer 124b (also shown in FIG. 3) being separate from a layer 124c on the third segment 108c, a portion of the second layer 122b located on the first section 102a engages a portion of the second layer 122b located on the second section 102b. Due in part to the second layer 122b being formed from a polyurethane material, the second layer 122b provides a frictional force between the portion of the second layer 122b located on the first section 102a in contact with the portion of the second layer 122b located on the second section 102b. The frictional forces between the portions of the second layer 122b are greater than frictional forces between soft, non-abrasive layers, such as microfiber. As a result, the accessory device 100 can resist unwanted movement when, for example, a user interacts with the display 186. Also, the third segment 108c provide direct support through engagement with the first section 102a. However, in this configuration, the third segment 108c may not be magnetically coupled with the first section 102a, and the weight of the electronic device 180 applies a force to the third segment 108c that maintains the triangular support.

Figure 12:
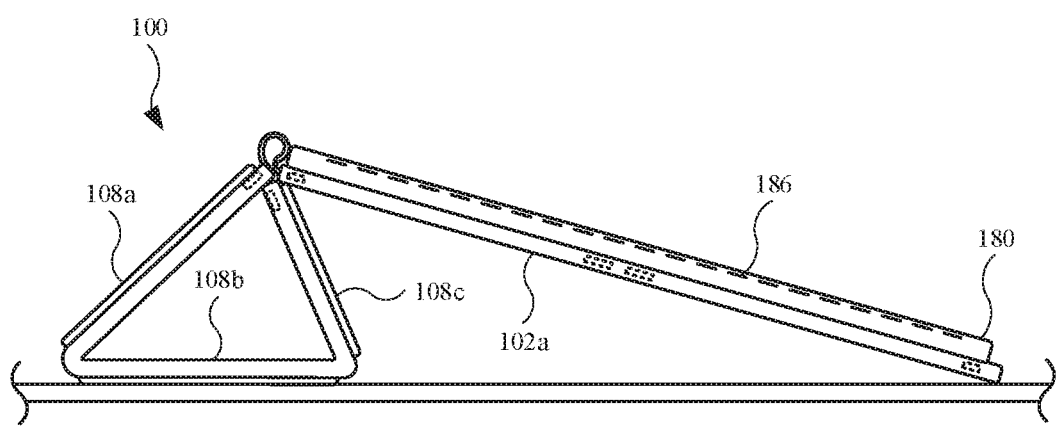
FIG. 12 illustrates a side view of the accessory device supporting the electronic device in an alternate configuration.

FIG. 12 illustrates a side view of the accessory device supporting the electronic device in an alternate configuration. The user of the electronic device 180 can also interact with the display 186 of the electronic device 180 in this configuration. As shown, the first segment 108a, the second segment 108b, and the third segment 108c can fold to form an alternate triangular support for the electronic device 180. The first section 102a is rigid and strong enough to support the electronic device 180 without bowing or warping, and accordingly, the first section 102a is not affected by the weight of the electronic device 180.

Figure 13:
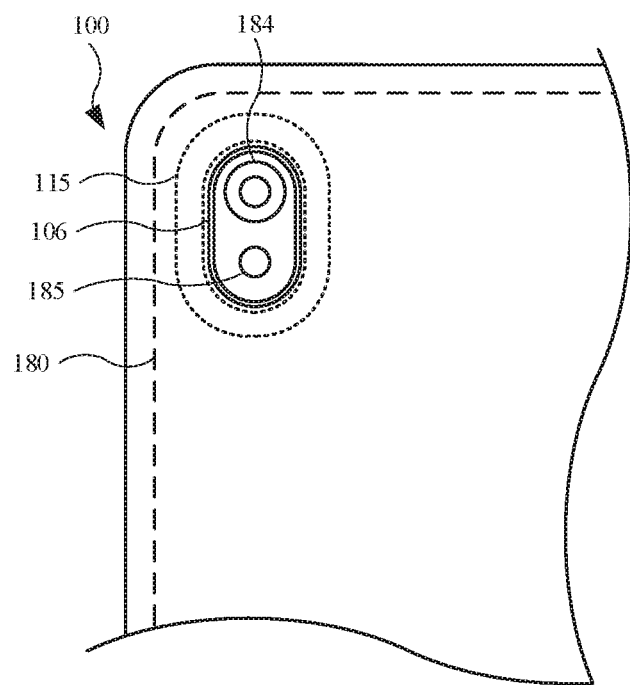
FIG. 13 illustrates a plan view of the accessory device, showing the camera assembly and the flash module of the electronic device positioned in the opening of the accessory device.

FIG. 13 illustrates a plan view of the accessory device 100, showing the camera assembly 184 and the flash module 185 of the electronic device 180 positioned in the opening 106 of the accessory device 100. As shown, the camera assembly 184 is allowed to capture images for the electronic device 180, and the flash module 185 may emit light to enhance the image capturing. Also, when the camera assembly 184 is in the opening 106, the reinforcement layer 115 surrounds the camera assembly 184.

Figure 14:
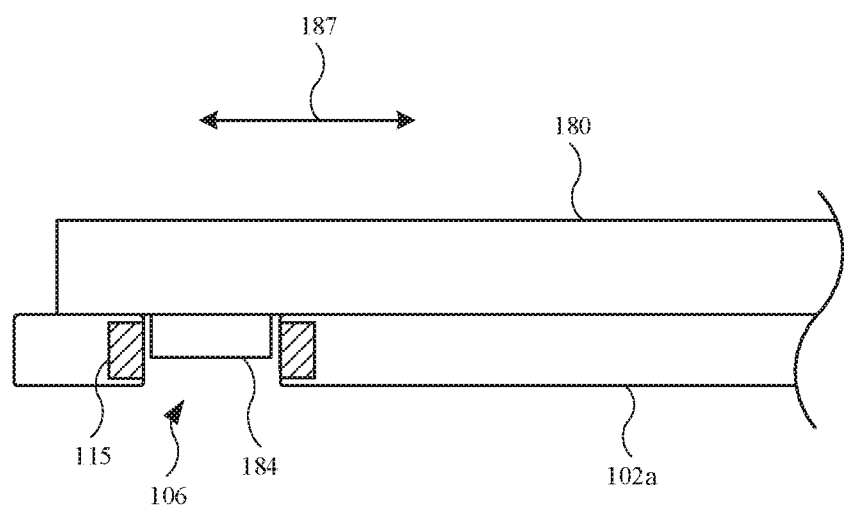
FIG. 14 illustrates a side view of the accessory device and the electronic device shown in FIG. 13, showing the camera assembly protruding through the opening of the accessory device.

FIG. 14 illustrates a side view of the accessory device 100 and the electronic device 180 shown in FIG. 13, showing the camera assembly 184 protruding through the opening 106 of the accessory device 100. A partial cross sectional view of the first section 102a is shown to show the reinforcement layer 115. When a force (denoted by two-sided arrow 187) is applied to the electronic device 180 that causes lateral movement in either direction of the two-sided arrow 187, a corresponding lateral movement of the camera assembly 184 also occurs. However, due in part to the camera assembly 184 being positioned in the opening 106, the camera assembly 184 can engage one or more surfaces that define the opening 106, and limit the movement of the camera assembly 184, thereby limiting the movement of the electronic device 180. This allows magnetic elements (not shown FIG. 14) in the first section 102a to remain magnetically coupled with magnetic elements (not shown FIG. 14) in the electronic device 180. Accordingly, the opening 106 provides a mechanical stop or interface when relative lateral movement of the electronic device 180 occurs.

Figure 15:
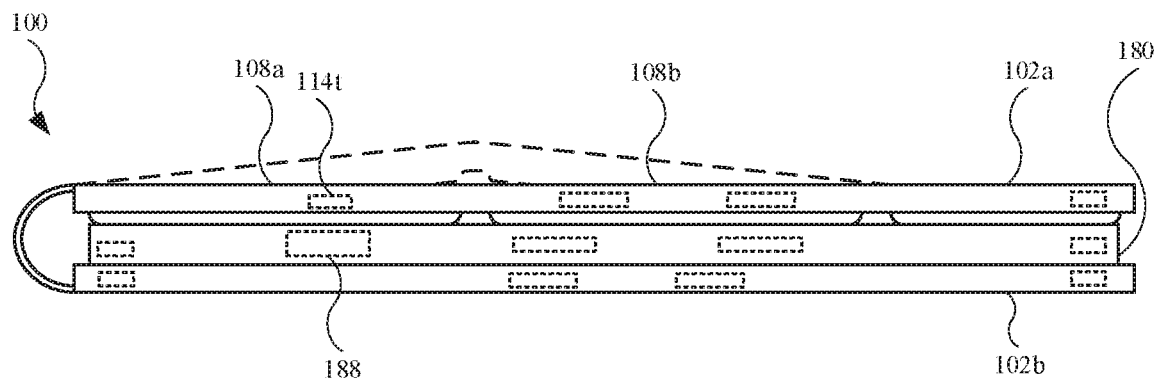
FIG. 15 illustrates a side view of the electronic device positioned between the first section and the second section of the accessory device, showing the first section and the second section extending beyond the electronic device.

FIG. 15 illustrates a side view of the electronic device 180 positioned between the first section 102a and the second section 102b of the accessory device 100, showing the first section 102a and the second section 102b extending beyond the electronic device 180. As shown, both the first section 102a and the second section 102b are engaged with the electronic device 180. Further, magnetic elements in the first section 102a and in the second section 102b may magnetically couple with magnetic elements in the electronic device 180. Moreover, the electronic device 180 may include an audio module 188, such as a speaker module, designed to generate acoustical energy in the form of audible sound. Audio modules of this kind are known in the art to include a permanent magnet. In some instances, when the accessory device 100 is exposed to heat, a material (or materials) of the accessory device 100 may bend or warp. For example, excess heat may cause the first segment 108a and the second segment 108b to extend away and at least partially disengage the electronic device 180, as indicated by the dotted lines. However, the accessory device 100 may include magnetic elements 114t in a location corresponding to the location of the audio module 188 such that magnetic elements 114t magnetically couple with the audio module 188, and in particular, a permanent magnet of the audio module 188. The magnetic attraction force between the magnetic elements 114t and the permanent magnet of the audio module 188 may cause the first segment 108a and the second segment 108b to remain engaged with the electronic device 180, and overcome issues related to excess heat. As shown, the magnetic elements 114t are located in the first segment 108a. However, the magnetic elements 114t can be located in the second segment 108b in order to accommodate a different location of the audio module 188 in the electronic device 180.

Figure 16:
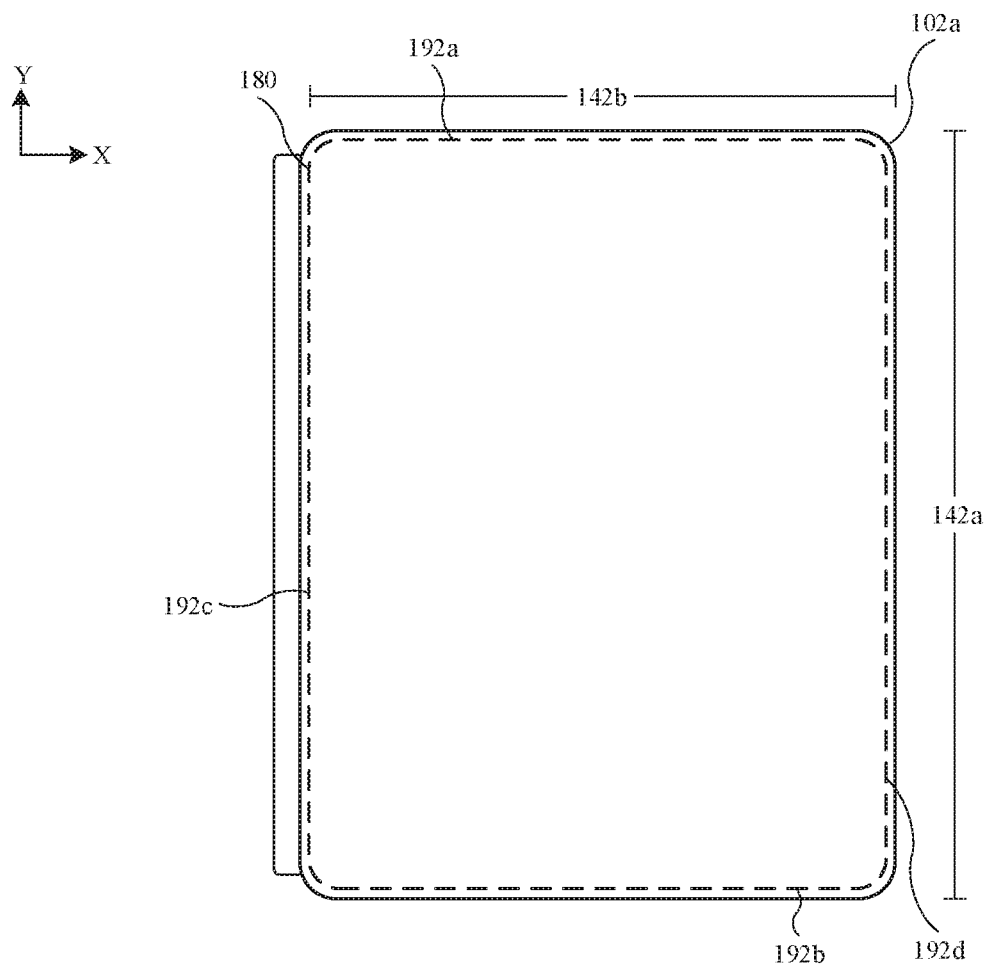
FIG. 16 illustrates a plan view of the electronic device and the accessory device shown in FIG. 15, showing the first section extending beyond the electronic device in multiple dimensions.

FIG. 16 illustrates a plan view of the electronic device 180 and the accessory device shown in FIG. 15, showing the first section 102a extending beyond the electronic device 180 in multiple dimensions. The electronic device 180 is covered by the first section 102a and is denoted by a dotted line. The accessory device 100 may include a dimension 142a that allows the first section 102a to extend beyond a first edge 192a and a second edge 192b of the electronic device 180. The accessory device 100 may include a dimension 142b that allows the first section 102a to extend beyond a third edge 192c and a fourth edge 192d of the electronic device 180. Accordingly, the first section 102a may extend beyond the electronic device 180 along both the X- and Y-axes. The second section 102b (not shown in FIG. 16) may include any dimensional features described for the first section 102a.

Figure 17:
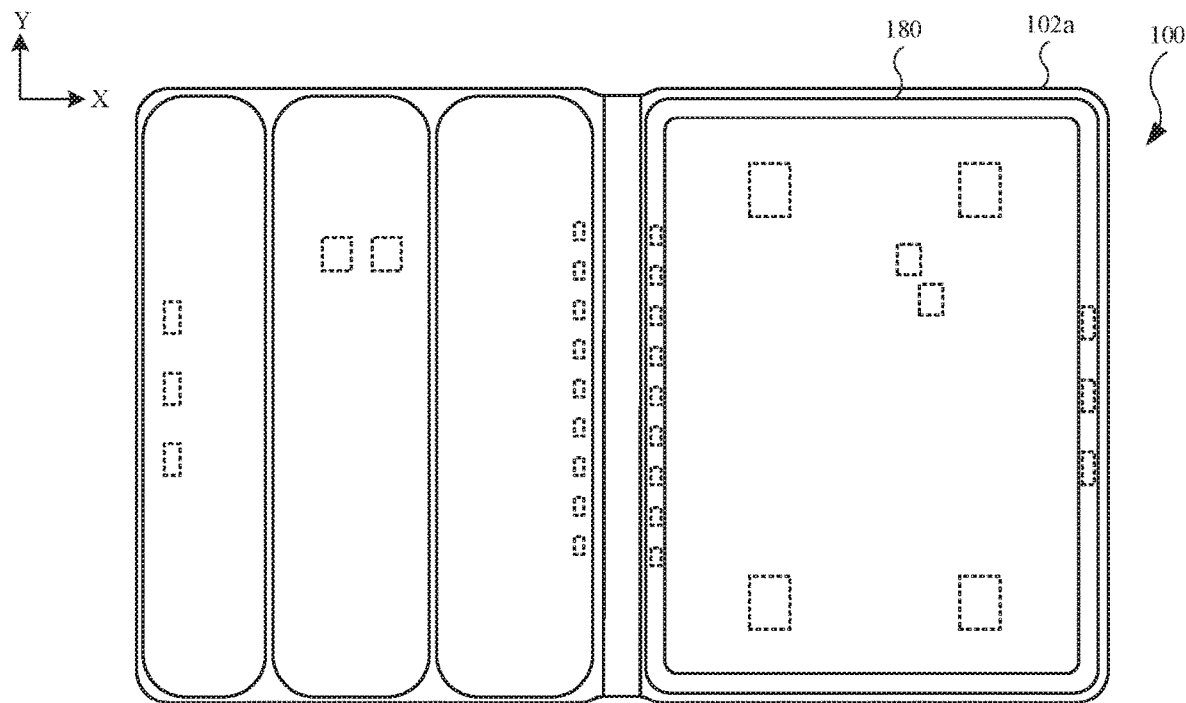
FIG. 17 illustrates a side view of the accessory device and the electronic device, showing the electronic device engaged with the first section.
Figure 18:
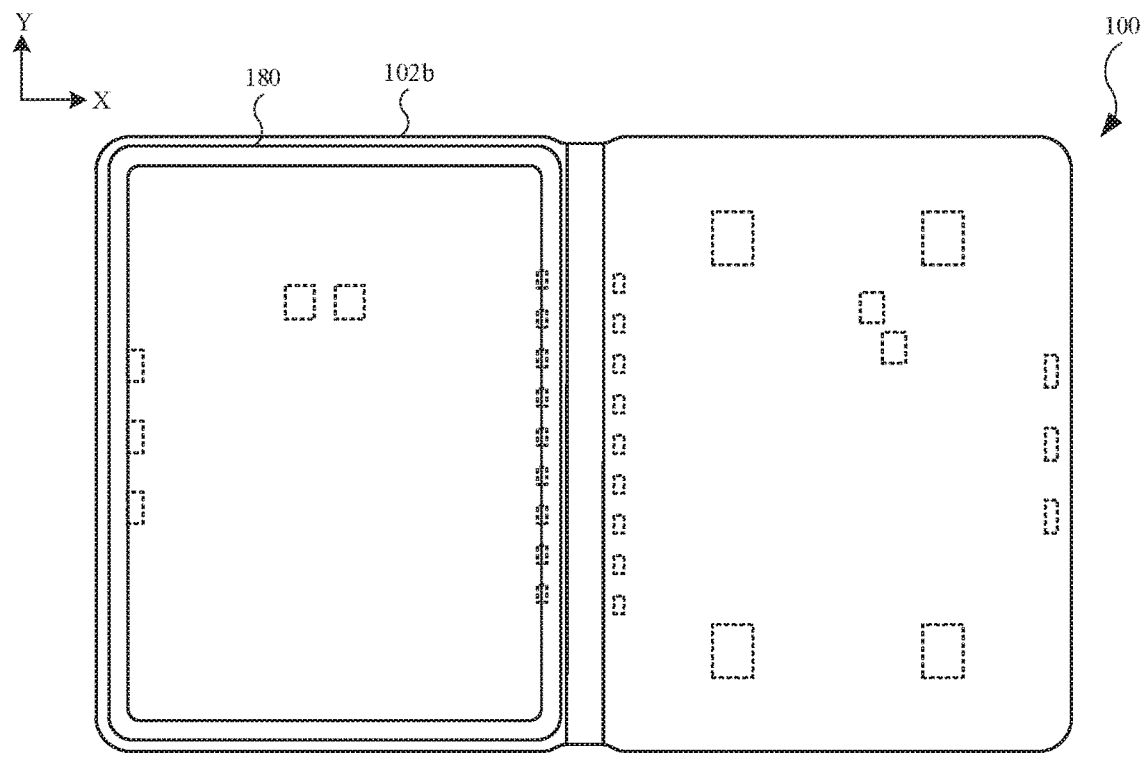
FIG. 18 illustrates a side view of the accessory device and the electronic device, showing the electronic device engaged with the second section.

FIGS. 17 and 18 show that the accessory device 100 includes a sufficient number of magnetic elements hold and retain the electronic device 180, even when the electronic device 180 and the accessory device 100 are upright such that gravitational forces are acting on the electronic device 180 that would otherwise push the electronic device 180 along a vertical Y-axis and off of the accessory device 100. FIG. 17 illustrates a side view of the accessory device 100 and the electronic device 180, showing the electronic device 180 engaged with the first section 102a. The magnetic elements (not labeled) in the first section 102a couple with magnetic elements (not shown in FIG. 17) of the electronic device 180 and provide a sufficient magnetic attraction force to such that gravitational forces and the weight of the electronic device 180 are countered, and the electronic device 180 remains engaged with the accessory device 100 along the first section 102a.

FIG. 18 illustrates a side view of the accessory device 100 and the electronic device 180, showing the electronic device 180 engaged with the second section 102b. The magnetic elements (not labeled) in the second section 102b couple with magnetic elements (not shown in FIG. 18) of the electronic device 180 and provide a sufficient magnetic attraction force to such that gravitational forces and the weight of the electronic device 180 are countered, and the electronic device 180 remains engaged with the accessory device 100 along the second section 102b.

Figure 19:
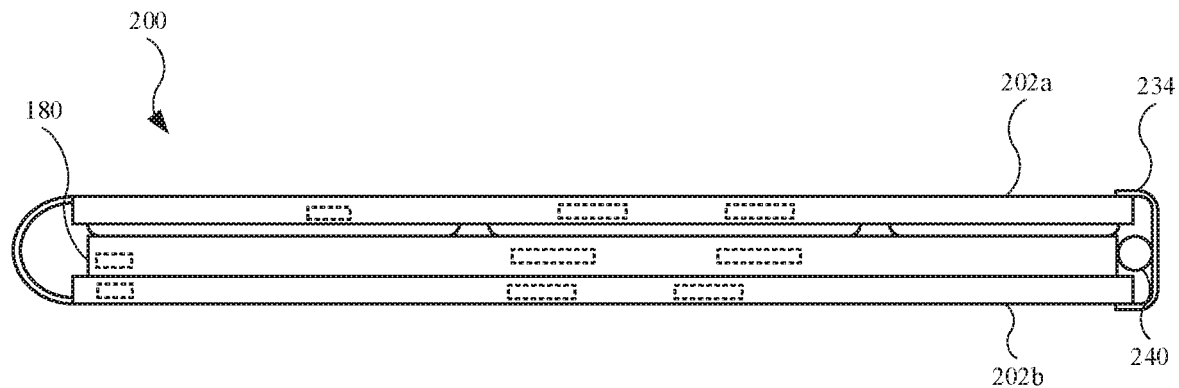
FIG. 19 illustrates a side view of an alternate embodiment of an accessory device holding the electronic device, further showing an object coupled with an edge of the electronic device.
Figure 20:
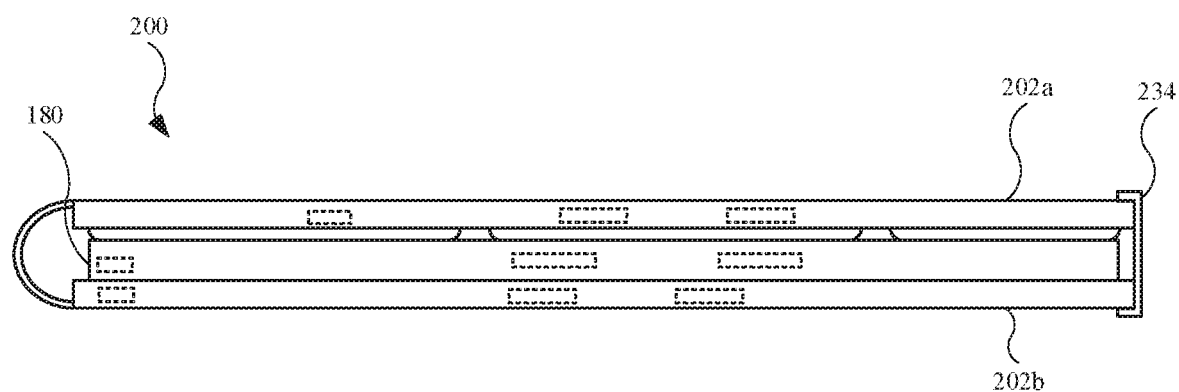
FIG. 20 illustrates a side view of the accessory device and the electronic device shown in FIG. 19, with the object removed.

FIGS. 19 and 20 show an alternate embodiment of an accessory device 200. It should be noted that the accessory device 200 may include any features described herein for the accessory device 100.

FIG. 19 illustrates a side view of an alternate embodiment of an accessory device 200 holding the electronic device 180, further showing an object 240 coupled with an edge of the electronic device 180. The object 240 may include a digital stylus designed to interact with the display 186 (not shown in FIG. 19) when the display 186 includes touch-screen capabilities or other input capabilities initiated by the object 240. The accessory device 200 may include a retaining element 234 coupled with a first section 202a and a second section of the accessory device 200. The retaining element 234 may include a satchel, or other type of strap, that engages and retains the object 240 such that the object 240 remains engaged with the electronic device 180 and/or the accessory device 200. The retaining element 234 may include elastic capabilities to provide additional retaining forces. The retaining element 234 may permanently couple with at least one of the first section 202a or the second section 202b. The permanent coupling may be through adhesives, sewing, melting, and/or other bonding techniques. Alternatively, the retaining element 234 may be removably coupled with at least one of the first section 202a and the second section 202b. The removable coupling may include reusable adhesive materials, hook and loop features (such as Velcro), or magnetic elements. As shown, the retaining element 234 protrudes beyond surfaces of the first section 202a and the second section 202b. However, in some embodiments (not shown in FIG. 19), each of the first section 202a and the second section 202b include a recess that receives the retaining element 234 such that the retaining element is flush, or co-planar, with a surface of the first section 202a and with a surface of the second section 202b.

FIG. 20 illustrates a side view of the accessory device 200 and the electronic device 180 shown in FIG. 19, with the object 240 removed. As shown, the retaining element 234 may contract so as to not extend in an unwanted manner, and such that it is not recognizable to a user that the retaining element 234 includes elastic properties in order to hold the object 240 (shown in FIG. 19). In this regard, the retaining element 234 may provide additional support that maintains the first section 202a and the second section 202b engaged with the electronic device 180, as well as promote a low-profile design of the accessory device 200.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An accessory device for a portable electronic device, the accessory device comprising:
   a first section that defines a receiving surface for retaining the portable electronic device, the first section further comprising a back surface opposite the receiving surface; and
   a second section coupled with the first section and capable of covering the portable electronic device when the portable electronic device is retained at the receiving surface, the second section comprising:
      a first segment comprising a first magnetic element, and
      a second segment comprising a second magnetic element that is capable of magnetically coupling with the first magnetic element, thereby causing the first segment to engage with the second segment, and when the first magnetic element is magnetically coupled to the second magnetic element, the first magnetic element is offset with respect to the second magnet element, wherein:
         a first disengagement of the first segment from the back surface initiates a second disengagement of the second segment from the back surface.

2. The accessory device of claim 1, wherein the first segment lacks a magnetic coupling with the second segment.

3. The accessory device of claim 1, wherein the first section comprises an opening that receives a camera assembly of the portable electronic device, and wherein when the first magnetic element magnetically couples with the second magnetic element, the opening is uncovered by the first segment.

4. The accessory device of claim 3, further comprising:
   a filler material embedded in the first section; and
   a reinforcement layer embedded in the first section and separate from the filler material, the reinforcement layer surrounding the opening.

5. The accessory device of claim 1, wherein the second section further comprises a third segment, and wherein the first disengagement and the second disengagement causes a third disengagement of the third segment.

6. The accessory device of claim 1, further comprising:
   a third magnetic element located in the first segment, the third magnetic element capable of magnetically coupling with the first magnetic element; and
   a fourth magnetic element located in the first segment, the fourth magnetic element capable of magnetically coupling with the second magnetic element.

7. The accessory device of claim 1, wherein when the portable electronic device is positioned on the receiving surface and the second section covers the portable electronic device, the first section and second section extend laterally beyond edges of the portable electronic device.

8. An accessory device for a portable electronic device, the accessory device comprising:
   a first section that defines a receiving surface for the portable electronic device, the first section comprising a first magnetic element and a second magnetic element; and
   a second section that is coupled with the first section and capable of covering the portable electronic device, the second section comprising:
      a first segment comprising a third magnetic element capable of magnetically coupling with the first magnetic element, the first segment further comprising a fourth magnetic element capable of magnetically coupling with the second magnetic element,
      a second segment rotationally coupled with the first segment, and
      a third segment rotationally coupled with the second segment, wherein when the portable electronic devices is positioned on the receiving surface and the second section covers the portable electronic device, the first section and second section extend laterally beyond edges of the portable electronic device.

9. The accessory device of claim 8, wherein the first section comprises a first dimension such that the first section extends beyond a first edge of the portable electronic device and a second edge of the portable electronic device.

10. The accessory device of claim 9, wherein the first section comprises a second dimension such that the first section extends beyond a third edge of the portable electronic device.

11. The accessory device of claim 10, wherein the second section extends beyond the first edge, the second edge, and the third edge.

12. The accessory device of claim 8, further comprising a magnetic element carried by the second section, the magnetic element configured to form a magnetically coupling with a magnetic element of an audio module located in the portable electronic device, wherein the magnetic coupling maintains the second section engaged with the portable electronic device.

13. The accessory device of claim 8, wherein the first segment lacks a magnetic coupling with the second segment.

14. An accessory device for a portable electronic device, the accessory device comprising:
a first section that defines a receiving surface for the portable electronic device, the first section further comprising a back surface opposite the receiving surface;
a first magnetic element and a second magnetic element embedded in the first section; and
a second section coupled with the first section and capable of covering the portable electronic device, the second section comprising:
a first segment comprising a third magnetic element, and
a second segment rotationally coupled with the first segment,
wherein:
a first magnetic coupling between the first magnetic element and the third magnetic element causes an alignment of the second section with the back surface, and
a second magnetic coupling between the second magnetic element and the third magnetic element cause the first segment to remain engaged with the second segment.

15. The accessory device of claim 14, further comprising a hinge that connects the first section with the second section.

16. The accessory device of claim 15, wherein the second segment is closer to the hinge than the first segment.

17. The accessory device of claim 14, wherein the first magnetic coupling causes the second section to align with the back surface prior to the second section lying flat on the back surface.

18. The accessory device of claim 14, wherein the first segment lacks a magnetic coupling with the second segment.

19. The accessory device of claim 14, further comprising:
an opening in the first section; and
a reinforcement layer embedded in the first section and surrounding the opening, the reinforcement layer configured to maintain a camera assembly of the portable electronic device within the opening.

\* \* \* \* \*